(12) United States Patent
Cunningham et al.

(10) Patent No.: US 12,518,108 B2
(45) Date of Patent: Jan. 6, 2026

(54) ELECTRONIC MESSAGE RESPONSE GENERATION

(71) Applicant: Sage Global Services Limited, Newcastle upon Tyne (GB)

(72) Inventors: Ben Cunningham, Warren, NJ (US); Chandan Kumar, Bangalore (IN); Matthew Shanahan, Clinton, WA (US); Peter Horadan, Henderson, NV (US); Rohit Kumar, Acton, MA (US); Srijith Rajamohan, Crozet, VA (US); Yu-Cheng Tsai, Redmond, WA (US)

(73) Assignee: Sage Global Services Limited, Newcastle upon Tyne (GB)

(*) Notice: Subject to any disclaimer, the term of this patent is extended or adjusted under 35 U.S.C. 154(b) by 60 days.

(21) Appl. No.: 18/670,393

(22) Filed: May 21, 2024

(65) Prior Publication Data

US 2024/0406124 A1 Dec. 5, 2024

Related U.S. Application Data

(60) Provisional application No. 63/537,272, filed on Sep. 8, 2023, provisional application No. 63/468,129, filed on May 22, 2023.

(51) Int. Cl.
*G06F 40/35* (2020.01)
*G06F 16/3329* (2025.01)
(Continued)

(52) U.S. Cl.
CPC .......... *G06F 40/35* (2020.01); *G06F 16/3329* (2019.01); *G06F 16/3344* (2019.01);
(Continued)

(58) Field of Classification Search
CPC .. G06F 40/35; G06F 16/3329; G06F 16/3344; G06F 40/186; G06F 40/30;
(Continued)

(56) References Cited

U.S. PATENT DOCUMENTS

2024/0296276 A1* 9/2024 Hattangady ........... H04L 51/216
2024/0346251 A1* 10/2024 Le .......................... H04L 51/02

* cited by examiner

Primary Examiner — Soe Hlaing
(74) Attorney, Agent, or Firm — Barclay Damon LLP; Daniel McGrath

(57) ABSTRACT

A computer implemented method for generating a response to a received electronic message. A generative AI is prompted to analyse the electronic message and to generate intent data indicative of an intent associated with the electronic message and data-identifier data indicative of one or more predetermined data identifiers present in the electronic message. The electronic message is analysed to identify and retrieve client data associated with one or more parties associated with the electronic message. The method includes Verifying the retrieved client data includes data corresponding to the generated data-identifier data. If so, query an ERP system with the verified data-identifier data to extract ERP data corresponding to the predetermined data identifiers of which the data-identifier data is indicative, select a response-message template using the intent data, populate the selected response-message template with the ERP data, and present the populated response-message template to a user for approval.

17 Claims, 8 Drawing Sheets

(51) Int. Cl.
    *G06F 16/334*     (2025.01)
    *G06F 40/186*     (2020.01)
    *G06F 40/30*     (2020.01)
    *G06N 3/0455*     (2023.01)
    *G06N 20/00*     (2019.01)
    *G06Q 10/107*     (2023.01)
    *H04L 51/02*     (2022.01)

(52) U.S. Cl.
    CPC ............ *G06F 40/186* (2020.01); *G06F 40/30* (2020.01); *G06N 3/0455* (2023.01); *G06N 20/00* (2019.01); *G06Q 10/107* (2013.01); *H04L 51/02* (2013.01)

(58) Field of Classification Search
    CPC .... G06N 3/0455; G06N 20/00; G06Q 10/107; H04L 51/02
    See application file for complete search history.

FIG. 4c

ELECTRONIC MESSAGE RESPONSE GENERATION

CROSS REFERENCE TO RELATED APPLICATIONS

This application claims priority to and the benefit of U.S. Provisional Patent Application No. 63/468,129, filed on May 22, 2023, entitled "GENERATIVE AI", and U.S. Provisional Patent Application No. 63/537,272, filed on Sep. 8, 2023, and entitled "GENERATIVE AI", the contents of each of which are incorporated herein by reference as though fully set forth herein.

TECHNICAL FIELD

The present invention relates to techniques for generating responses to received electronic messages.

BACKGROUND

AP (accounts payable) and AR (account receivable) professionals face a significant challenge in managing high volumes of e-mails every day. This constant influx of correspondence can be overwhelming and time consuming, as they must meticulously sort, prioritize, and address various inquiries, request and concerns from clients, vendors, and internal stakeholders. Additionally, they need to be extra cautious to ensure that correct information in conveyed while maintaining efficient communication.

This is very demanding and has often been cited as one of the most challenging problems faced by the accounting professionals. Failure to manage this communication can lead to missed deadlines, miscommunication, and strained relationships with both internal and external stakeholders.

FIG. 1 depicts the current way of working for the accountants. For every incoming e-mail, they must go through number of steps to respond to an e-mail. According to certain estimations, given that the response time for an e-mail ranges between two to five minutes, and assuming an accountant receives approximately fifty e-mails per day, the time dedicated solely to e-mail response could exceed two hours each day.

SUMMARY

In accordance with a first aspect of the invention, there is provided a computer implemented method for generating a response to a received electronic message. The method comprises: receiving an electronic message; prompting a generative AI to analyse the electronic message and to generate: intent data indicative of an intent associated with the electronic message, and data-identifier data indicative of one or more predetermined data identifiers present in the electronic message; analysing the electronic message to identify and retrieve client data associated with one or more parties associated with the electronic message; verifying that the retrieved client data comprises data corresponding to the generated data-identifier data, and if so: querying an ERP system with the verified data-identifier data to extract ERP data corresponding to the predetermined data identifiers of which the data-identifier data is indicative; selecting a response-message template using the intent data; populating the selected response-message template with the ERP data, and presenting the populated response-message template to a user on a user interface for approval.

Optionally, the electronic message is an e-mail.

Optionally, the generative AI comprises a Large Language Model (LLM) AI.

Optionally, the step of prompting the generative AI to generate intent data comprises prompting the generative AI to generate the intent data in accordance with a constraint instruction instructing the generative AI to constrain the format of the intent data.

5. A computer implemented method according to claim 4, wherein the constraint instruction comprises an instruction to constrain the format of the intent data to fewer than a predetermined number of words.

Optionally, prompting the generative AI comprises: extracting unstructured text data from the electronic message; generating an input prompt comprising at least some of the unstructured text data from the electronic message and an instruction to analyse the unstructured text data to generate the intent data and the data-identifier data, and inputting the input prompt to the generative AI.

Optionally, the predetermined data identifiers identify one or more transactions between a party associated with a sender of the electronic message and a party associated with the recipient of the electronic message.

Optionally, the response-message template is associated with an accounts-receivable (AR) or accounts-payable (AP) process.

In accordance with a second aspect of the invention, there is provided a computer system for generating a response to a received electronic message. The system comprises: a message receiving application configured to receive an electronic message and forward the received electronic message to a message processing system, said message processing system configured to: prompt a generative AI to analyse the electronic message and to generate: intent data indicative of an intent associated with the electronic message, and data-identifier data indicative of one or more predetermined data identifiers present in the electronic message; analyse the electronic message to identify and retrieve client data associated with one or more parties associated with the electronic message; verify that the retrieved client data comprises data corresponding to the generated data-identifier data, and if so: query an ERP system with the verified data-identifier data to extract ERP data corresponding to the predetermined data identifiers of which the data-identifier data is indicative; select a response-message template using the intent data; populate the selected response-message template with the ERP data, and forward the populated response-message template to the message receiving application for displaying to a user on a user interface for approval.

Optionally, the electronic message is an e-mail.

Optionally, the generative AI comprises a Large Language Model (LLM) AI.

Optionally, the message processing system is configured to prompt the generative AI to generate the intent data in accordance with a constraint instruction instructing the generative AI to constrain the format of the intent data.

Optionally, the constraint instruction comprises an instruction to constrain the format of the intent data to fewer than a predetermined number of words.

Optionally, the message processing system is configured to prompt the generative AI by: extracting unstructured text data from the electronic message; generating an input prompt comprising at least some of the unstructured text data from the electronic message and an instruction to analyse the unstructured text data to generate the intent data and the data-identifier data, and inputting the input prompt to the generative AI.

Optionally, the predetermined data identifiers identify one or more transactions between a party associated with a sender of the electronic message and a party associated with the recipient of the electronic message.

Optionally, the response-message template is associated with an accounts-receivable (AR) or accounts-payable (AP) process.

In accordance with a third aspect of the invention, there is provided a computer program providing instructions which when implemented on a computer system implements a method according to the first aspect.

Techniques in accordance with certain embodiments of the invention provide an improved ability to generate precise responses to received message, such as e-mails, and particularly those concerning Accounts Receivable (AR) and Accounts Payable (AP) operations.

Firstly, a generative AI system is used to detect the intent of an incoming message and also identify any data-identifier data, such as invoice numbers or purchase order numbers, present in the message. Data relating to the message itself (for example sender and recipient data present in the header of an e-mail message) is then used to retrieve stored client data related to the sender and recipient of the e-mail. This data is analysed to correlate, and thereby validate the data-identifier data found in the message with data identifiers known to be associated with the sender and/or recipient of the message.

If necessary, the validated data-identifier data can be used to retrieve relevant Enterprise Resource Planning (ERP) data from an ERP database. For example, a validated purchase order number could be used to retrieve an electronic version of the purchase order, or a validated invoice number could be used to retrieve an electronic version of the invoice.

The intent data initially recognised by the generative AI system is used to select a suitable reply-message template. This template is populated with the retrieved ERP data if required and formulated as a proposed response to the received e-mail.

Before sending, the proposed response is presented back to the user for confirmation.

Various further features and aspects of the invention are defined in the claims.

BRIEF DESCRIPTION OF THE DRAWINGS

Embodiments of the present invention will now be described by way of example only with reference to the accompanying drawings where like parts are provided with corresponding reference numerals and in which:

FIG. 4*c* demonstrates an email template, selected and populated based on the information received in the email depicted in FIG. 4*b*, as viewed through the front end interface and in accordance with an example of the technique;

DETAILED DESCRIPTION

Figure 1:
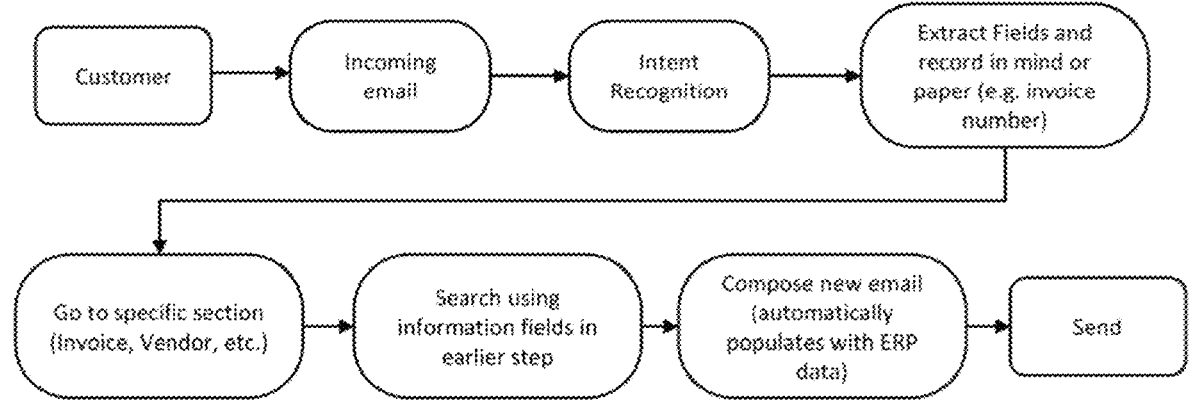
FIG. 1 depicts the traditional workflow followed by accountants prior to the implementation of the present technique.
Figure 2:
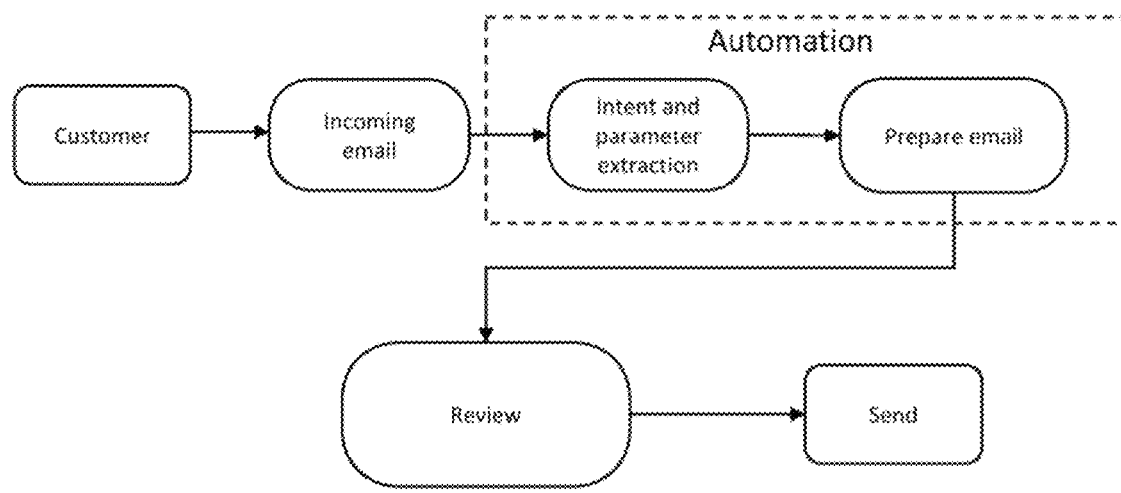
FIG. 2 provides a process flow diagram that outlines the sequence of steps involved in the operation of the present technique.

FIG. 2 provides a diagram depicting a process flow in accordance with the present technique in which once an incoming e-mail has been received, it undergoes an automation process whereby the intent of the e-mail and parameters associated with the e-mail are extracted, and on this basis, an e-mail is automatically prepared which is then forwarded to a user for review, and on approval by the user, is then sent.

This technique can be usefully deployed in platforms configured to automate accounting workflows which are centred around the sending and receiving of e-mails, where those workflows relate, for example, to the management of accounts receivable and accounts payable tasks.

In particular, when deployed in a suitable platform, the technique can generate a recommended reply to an incoming e-mail by
  a) extracting relevant information from an ERP system
  b) using a template-based method which involves retrieving relevant templates
  c) putting in place techniques to explicitly account for overall accuracy.

This template-based technique takes advantage of recent advances in "generative AI" but is adapted to overcome the shortfalls of this technology, namely the fact that the output of many LLMs is not strictly deterministic and that in some cases, inaccurate information can be generated (as in the case of LLM "hallucination").

The current technique provides a number of advantages:
  1. Confidence: From a response point of view, it is deterministic in nature, it provides the necessary confidence to the end user that random content is not transmitted.
  2. Accuracy: ERP information for the templates is extracted using generative AI and multiple precautionary steps incorporated to ensure maximum accuracy of response.
  3. Efficiency: The overall time to respond to an e-mail is dramatically reduced.
  4. Free time: It frees up the time for accountants to focus on other important issues.

Figure 3:
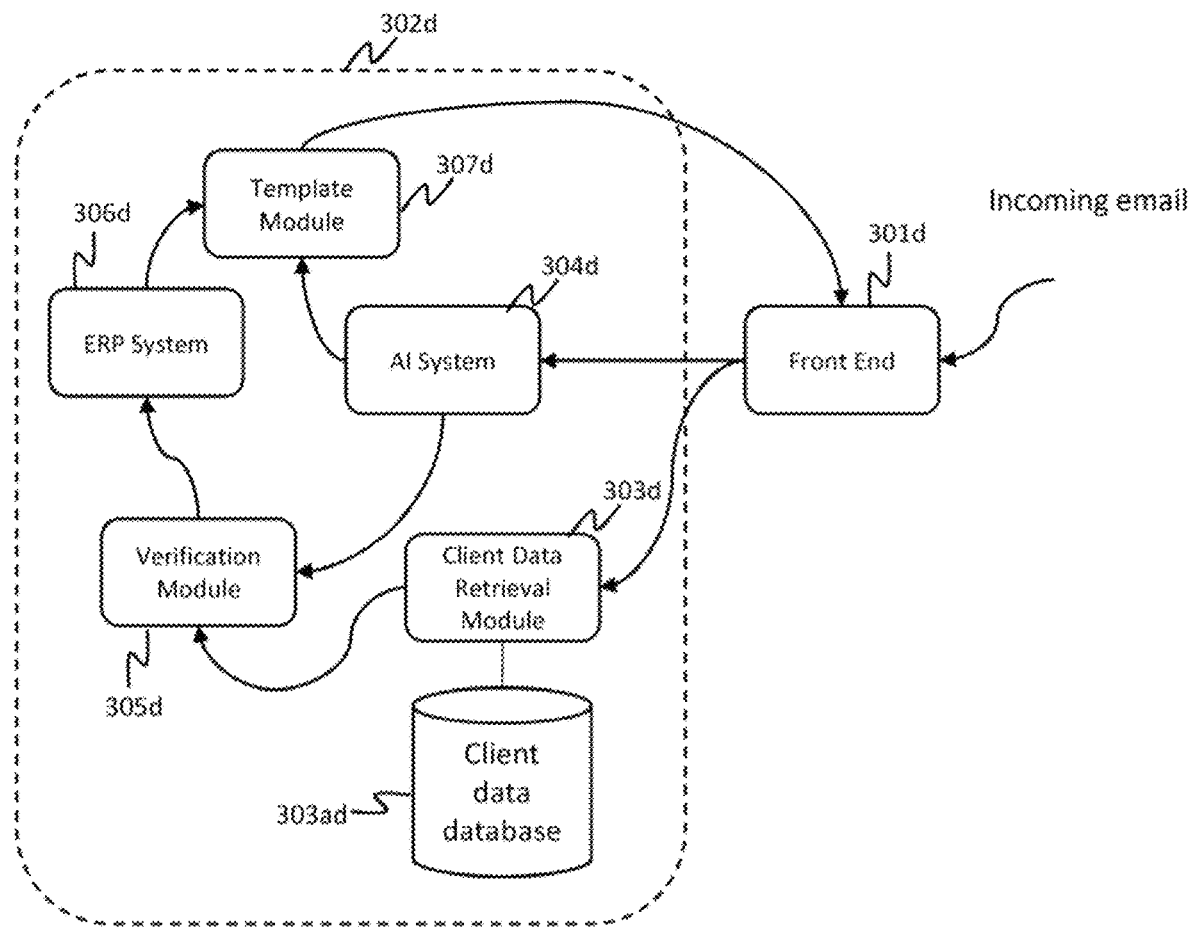
FIG. 3 presents a high-level diagram that illustrates the main functional units involved in implementing an example of the technique.

FIG. 3 provides a high level diagram depicting the functions of a system for implementing the technique.

The system comprises a front end 301*d* and a back end 302*d*. The front end 301*d* is typically provided by a suitable message receiving application, and the back end 302*d* provides a message processing system. The back end 302*d* comprises a client data retrieval module 303*d* and an AI system 304*d* each configured to receive data from the front end 301*d*, a verification module 305*d* configured to receive data from the client data retrieval module 303*d* and the AI system 304*d*; an ERP system 306*d* configured to receive data from the verification module 305*d*, and a template module 307*d* configured to receive data from the AI system 304*d* and the ERP system 306*d*.

The AI system 304*d* incorporates an LLM or means to access one or more LLMs.

In use, the front end 301*d* is configured to receive an e-mail from an e-mail client which is then forwarded to the client data retrieval module 303*d* and AI system 304*d*.

At the client data retrieval module 303*d*, the e-mail is analysed to identify relevant client data pertaining to the e-mail. This process typically comprises identifying one or more parties associated with the e-mail, most typically the sender and recipient of the e-mail and, once this is done, identifying and retrieving client data associated with these parties. For example, a received e-mail can be analysed to identify the sender and recipient, and then client data associated with this sender/recipient pair is identified and retrieved from a client data database 303*ad*.

Any suitable technique can be used to achieve this. In one example, the client data retrieval module 303*d* analyses metadata provided with the e-mail, particularly the details present in the e-mail's header to identify the sender and recipient. This can include, for example, identifying the sender's and recipient's e-mail addresses, domain information, and potentially any other similar embedded information. Once, the sender and recipient pair have been identified, the client data retrieval module 303*d* correlates this sender/recipient pair with the stored client data, stored in the client data database 303*ad*, to identify client data associated with this sender/recipient pair.

It will be understood that the client data retrieval module 303*d* can use any suitable technique for identifying the parties associated with the received e-mail. For instance, it could perform textual analysis using natural language processing to understand the context of the e-mail, parsing for key phrases, words, or topics associated with client data. If the e-mail contains attachments, these could be parsed and analysed for additional information. Details from e-mail signatures, such as the sender's role or organisation, can also provide valuable data. Analysis might also be conducted on in-e-mail links, timestamps, time zone information, and the recipient list if the e-mail is sent to multiple parties. These techniques, used alone or in combination by the module, can provide a rich and diverse set of client data related to an e-mail, always respecting privacy laws and regulations."

The client data typically includes data records relating to previous exchanges between the sender of the received e-mail and the recipient of the received e-mail, for example data records of previously exchanged e-mail messages and/or any other suitable data records that may be maintained by the back end 302*d* relating to interactions between the sender of the received e-mail and the recipient of the received e-mail.

The client data will typically include references to various data identifiers relating to transactions between the sender of the received e-mail and the recipient of the received e-mail, for example, but not limited to, invoice numbers, purchase order numbers, tax ID data, company IDs, customer or vendor IDs, product or service IDs, delivery or shipment IDs, employee IDs, department or cost centre IDs, transaction or reference IDs, contract IDs, project IDs and so on.

At the AI system 304*d*, data from the e-mail, for example unstructured text data from the subject header and the body of the e-mail, is passed through the LLM with one or more suitable prompts to identify:

1) the "intent" of the received e-mail (i.e., the presumed purpose, goal, or aim that the sender of the e-mail had in mind when composing and sending the e-mail, typically conveyed through the specific language, context, tone, and subject matter used), and
2) one or more predetermined data identifiers that identify data stored in the ERP system 306*d* which is necessary to reply to the received e-mail. As discussed above, these data identifiers may include, amongst others, invoice numbers, purchase order numbers, tax ID data, company IDs, customer or vendor IDs, product or service IDs, delivery or shipment IDs, employee IDs, department or cost centre IDs, transaction or reference IDs, contract IDs, project IDs and so on).

In some examples, the prompt includes a constraint instruction instructing the AI system to constrain the format of the intent data that it outputs. More specifically, since LLM-based AI systems are generative models, they can often provide a very detailed response when prompted to identify the intent of an e-mail. This may make it harder to map intent to an e-mail template. Accordingly, an intelligent prompting strategy to constrain the output of an LLM can be used, for example: "Extract the intent of the following e-mail in fewer than 5 words . . . ". Accordingly, in certain examples, the constraint instruction comprises an instruction to constrain the format of the intent data to fewer than a predetermined number of words.

A suitable prompt to identify the data identifiers can include a request to identify specific data identifiers or all data identifiers that appear relevant.

The data identifiers identified by the AI system 304*d* and the client data retrieved by the client data retrieval module 303*d* are forwarded to the verification module 305*d* which is configured to perform a verification operation whereby the data identifiers identified by the AI system 304*d* are compared against the client data identified by the client data retrieval module 303*d* to verify that the data identifiers do indeed pertain to relevant client data and have not, for example, been "hallucinated" by the AI system 304*d*. For example, if the data identifiers identified by the AI system 304*d* comprise one or more invoice numbers, the verification module 305*d* would determine whether or not the client data retrieved by the client data retrieval module 303*d* includes reference to such invoice numbers.

Assuming that the verification module 305*d* verifies the data identifiers identified by the AI system 304*d*, the verification module 305*d* passes these data identifiers to the ERP system 306*d*. The ERP system 306*d* is configured to identify ERP data corresponding to the verified data identifiers, for example invoice data relating to the invoice numbers, and pass this ERP data to the template module 307*d*.

Meanwhile, the AI system 304*d* forwards intent data corresponding to the identified intent of the received e-mail to the template module 307*d*. The template module 307*d* uses this intent data to select an appropriate e-mail template for responding to the received e-mail and then populates this e-mail template with the relevant ERP data received from the ERP system 306*d*. This populated e-mail template is then forwarded by the template module 307*d* to the front end 301*d* which presents the populated e-mail template to a user for review. If the user approves the populated template, it is then sent. In this way, a response e-mail is generated in response to the receipt of the original received e-mail in an automated fashion requiring the user just to review the e-mail before it is sent out.

Figure 4A:
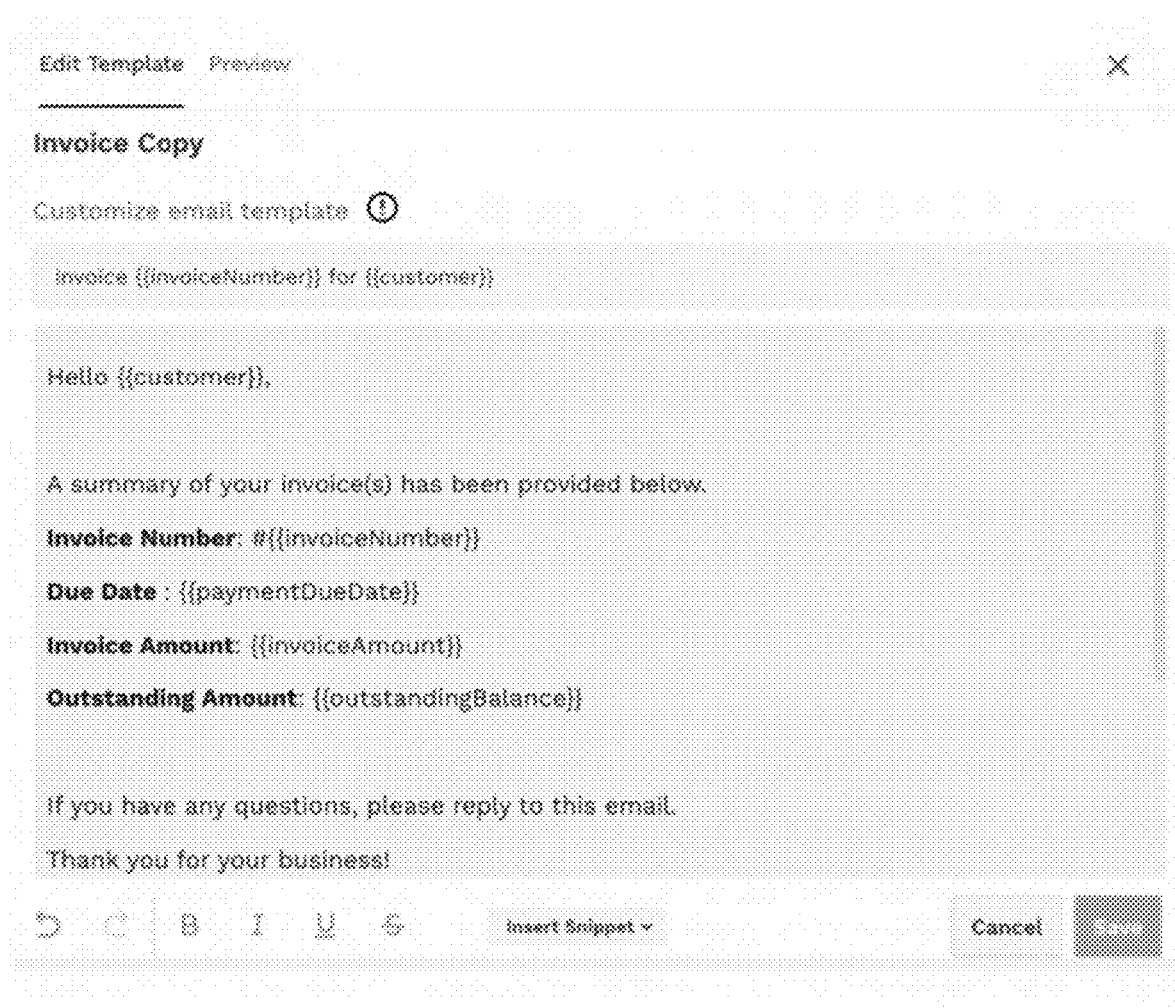
FIG. 4*a* offers a representation of a sample invoice template, which can be selected within a template module in accordance with certain examples of the technique.

FIG. 4*a* provides a diagram of an example invoice template of the type selected at the template module 307*d*. Based on the client data retrieved by the client data retrieval module 303*d*, and verified by the verification module 305*d*, the template will be populated by the template module 307*d* with ERP data from the ERP system 306*d*.

Figure 4B:
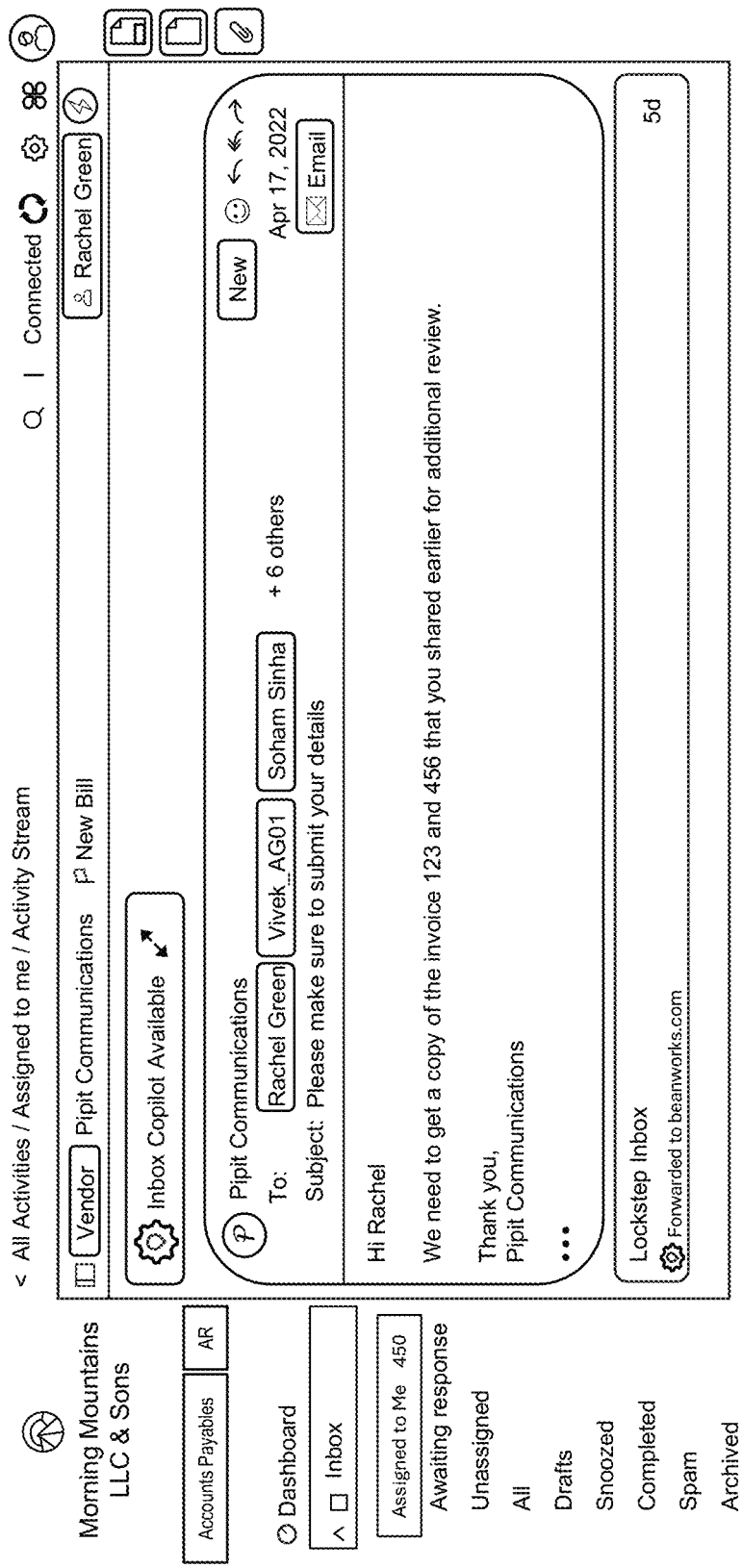
FIG. 4*b* illustrates an exemplary incoming email that can be received in accordance with an example of the technique.

FIG. 4*b* provides a diagram depicting an example incoming e-mail from "Abbie". In such an example the e-mail is passed to the AI system 304*d* which extracts:

a) intent of the e-mail: "request for invoice"

b) Data identifiers: Invoice 123 and Invoice 456.

Figure 4C:
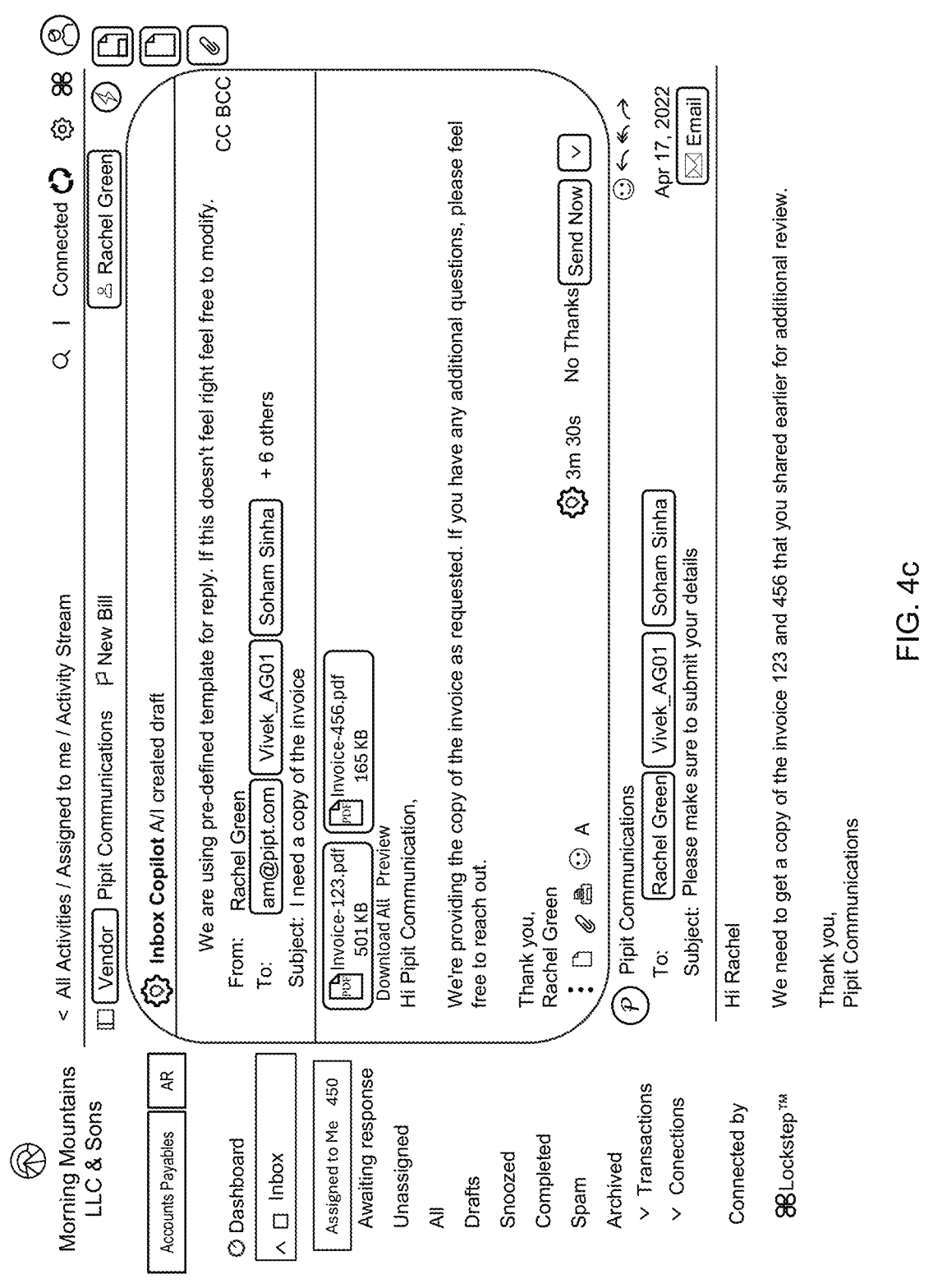

Using the technique described above, this information is used to select and populate an e-mail template as depicted in the front end interface shown in FIG. 4*c*. The interface requests a user to perform a quick review and then send the generated e-mail.

Figure 4D:
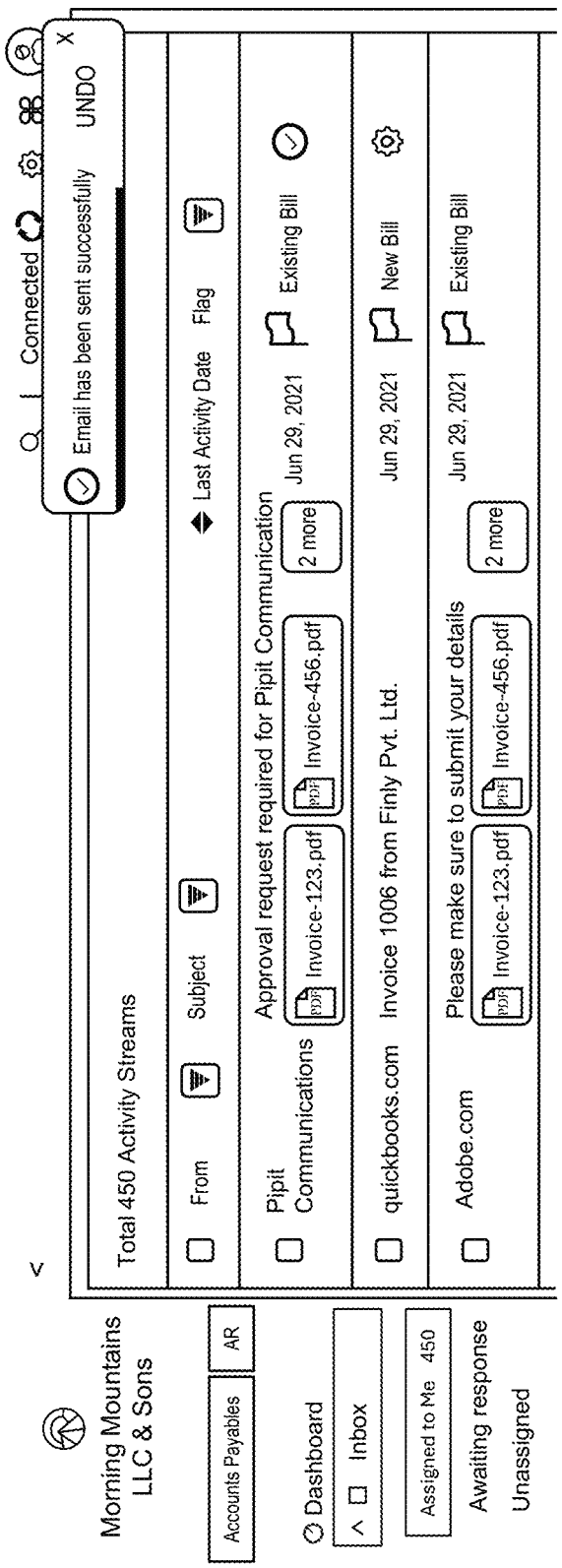
FIG. 4*d* provides a diagram depicting an interface generated at the front end after the generated e-mail has been sent.

FIG. 4*d* provides a diagram depicting an interface generated at the front end after the generated e-mail has been sent.

Figure 5:
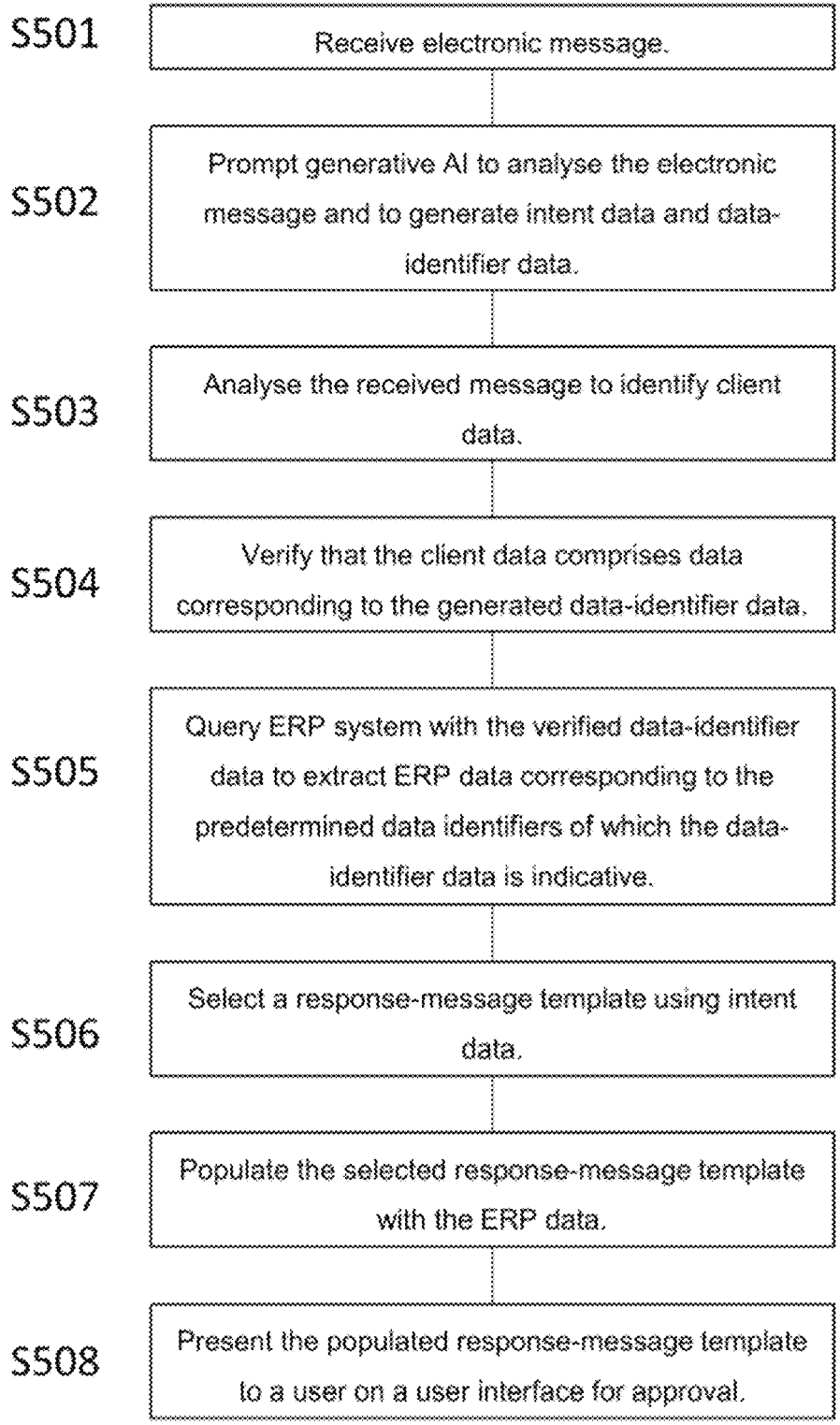
FIG. 5 shows a flow diagram that details the steps of a computer-implemented method in accordance with certain examples of the technique.

FIG. 5 provides a flow diagram depicting the steps of a computer implemented method for generating a response to a received electronic message in accordance with examples of the technique.

A first step S501 comprises receiving an electronic message.

A second step S502 comprises prompting a generative AI to analyse the electronic message and to generate: intent data indicative of an intent associated with the electronic message, and data-identifier data indicative of one or more predetermined data identifiers present in the electronic message.

A third step S503 comprises analysing the received message to identify client data associated with one or more parties associated with the received electronic message.

A fourth step S504 comprises verifying that the client data comprises data corresponding to the generated data-identifier data.

If so, a fifth step S505 comprises querying an ERP system with the verified data-identifier data to extract ERP data corresponding to the predetermined data identifiers of which the data-identifier data is indicative.

A sixth step S506 comprises selecting a response-message template using intent data. A seventh step S507 comprises populating the selected response-message template with the ERP data.

An eighth step S508 comprises presenting the populated response-message template to a user on a user interface for approval.

The examples described above are specifically configured to handle electronic communications in the form of emails. However, it will be readily apparent to one skilled in the art that the system and methods described can be applied to a broad array of electronic messaging systems and protocols. These alternative embodiments can utilize similar logic and operations to process a variety of electronic messages, taking into consideration the particular characteristics and features of the specific electronic message format For example, systems arranged in accordance with alternative embodiments could be configured to receive and then generate responses to electronic communications such as text or multimedia messages commonly used in mobile communication, direct or private messages received from various social media platforms, messages transmitted via different instant messaging systems, dialogues exchanged with chatbots across a myriad of applications, from e-commerce to customer service interfaces, or virtual personal assistants, communications from collaboration platforms typically used in business and project management settings, submissions received via web-based contact or feedback forms, and textual messages generated during virtual meetings on video conferencing platforms.

In the examples described above, the AI system, which processes received electronic messages, has been described with reference to a Large Language Model (LLM). However, a person skilled in the art would readily appreciate that in alternative embodiments, other generative AI techniques could be used. For example, Sequence-to-Sequence models or Recurrent Neural Networks could be employed to process and generate responses to the electronic messages. Furthermore, techniques such as Named Entity Recognition or Intent Recognition models might be applied to understand the underlying intent of the message and to extract crucial parameters. For more standardised message formats, a rule-based system or pattern matching using regular expressions could be deployed.

Figure 6:
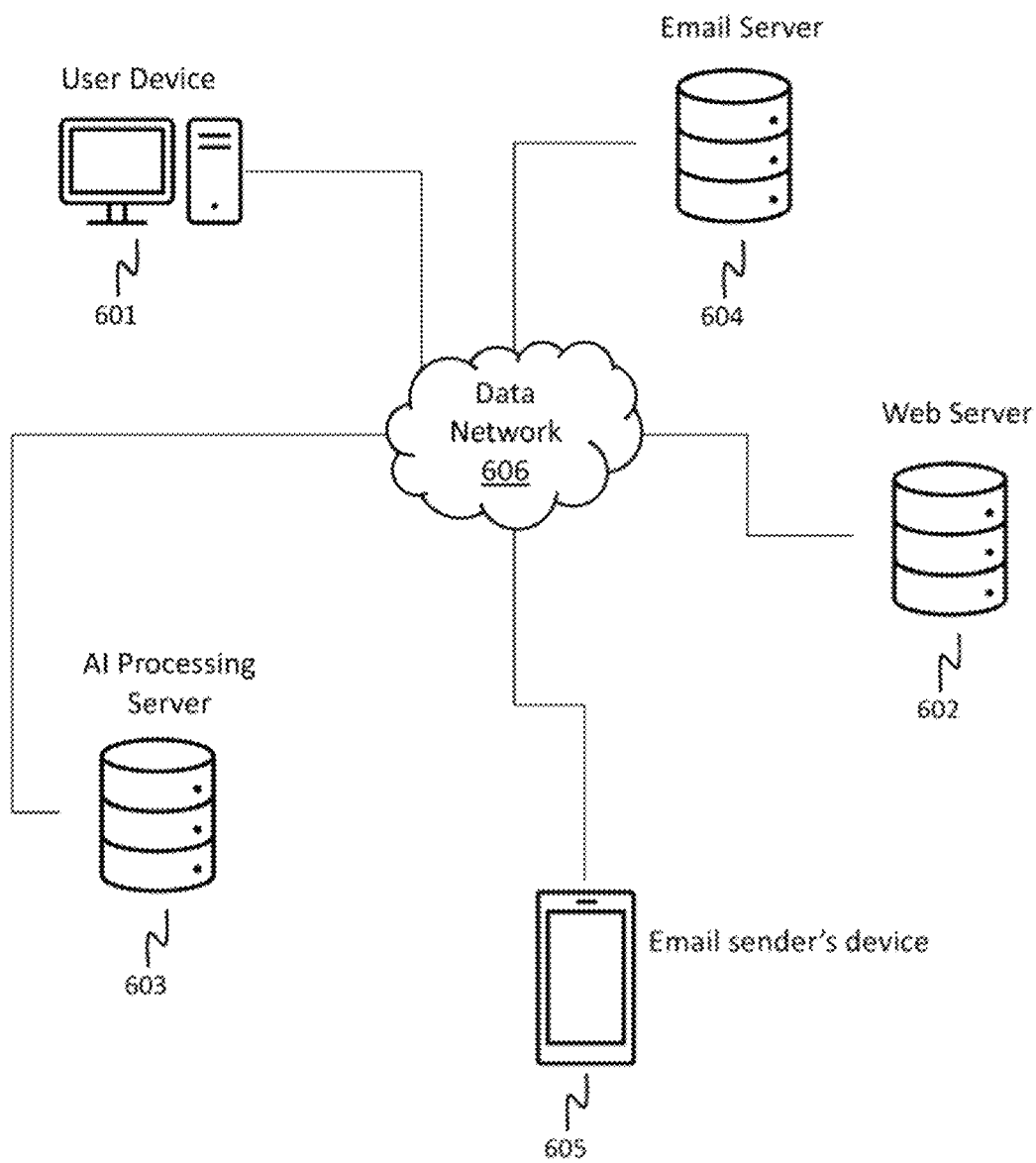
FIG. 6 depicts an example of a system configured to implement the functional units described with reference to FIG. 3.

The system for generating proposed responses to received electronic messages depicted in FIG. 3 can be manifested in any suitable way as would be apparent to the skilled person. FIG. 6 provides a simplified schematic diagram depicting an illustrative example of such a physical implementation.

The system depicted in FIG. 6 comprises several interconnected components: a user device 601*d*, a web server 602*d*, an AI processing server 603*d*, an email server 604*d*, an email sender's device 605*d*, and a data network 606*d*.

In this example, the user device 601*d* (for example smartphone, tablet, personal computer or other suitable computing device) is the hardware through which the user interacts with the system, typically through a web browser. The web server 602*d* hosts a front-end web application that the user interacts with. The AI processing server 603*d* hosts the back-end of the system, which includes the AI system that analyses emails and proposes responses. The email server 604*d* is where the email client software resides; it is responsible for receiving emails from the sender and forwarding them to the front-end, and for sending out approved responses. The email sender's device 605*d* is the hardware used by the person or system sending the initial email. Finally, the data network 606*d* represents the network (such as the internet) that facilitates communication among all the components.

This physical implementation corresponds to the functional arrangement depicted in FIG. 3. The front-end 301*d* in FIG. 3 corresponds to the combination of the user device 601*d* running a web browser, and the web server 602*d*. The back-end 302*d* in FIG. 3 is implemented on the AI processing server 603*d*.

When an email is received, it is sent from the email sender's device 605*d* to the email server 604*d* via the data network 606*d*. The front-end running on the web server 602*d* accesses this email. The email is then forwarded to the AI processing server 603*d* by the front-end running on the web server 602*d*. The AI processing server 603*d* then processes the email as described above. Once the AI processing server 603*d* generates a proposed response, it is communicated back to the front-end running on the web server 602*d* and presented to the user on the user device 601*d*.

If the user approves the proposed response, the approval is communicated from the web server 602*d* to the email server 604*d* via the data network 606*d*. Finally, the email server 604*d* sends the approved response to the email sender's device 605*d* through the data network 606*d*, thereby completing the process.

As the skilled person will understand, the example described with reference to FIG. 6 is purely illustrative.

As the skilled person will understand, systems for implementing the techniques described above can be implemented using any suitable hardware arrangement including workstations, servers, mobile devices, or embedded systems. This also includes specialized AI hardware like Graphics Processing Units (GPUs), Tensor Processing Units (TPUs), Field Programmable Gate Arrays (FPGAs), Application-Specific Integrated Circuits (ASICs), or other similar hardware suitable for machine learning tasks.

Furthermore, as the skilled person will understand, systems for implementing the techniques described above can be implemented using any suitable programming languages, such as Python, Java, C++, or others, and any suitable AI libraries like TensorFlow, PyTorch, or others. They can be executed as standalone applications, web-based applications, mobile applications, or as parts of larger software systems, or any other suitable deployment methods. The systems can also be containerised for deployment in diverse settings using technologies like Docker, Kubernetes, or similar technologies.

Moreover, as the skilled person will understand, the software implementing the techniques described above can be deployed in various configurations. The message-receiving front end and the message processing back end can be housed within a single application on a single device. Alternatively, these functional elements can be distributed across multiple devices. They can also be divided into separate modules, which can either operate independently or be integrated into the functionality of other applications.

The invention disclosed herein relates to systems in which queries are passed to Large Language Models (LLMs), similar artificial intelligence mechanisms, and systems in which such LLMs and similar AIs are trained. It should be understood that these systems can be implemented in various ways, depending on the specific requirements and constraints of the application.

The systems can be implemented in different types of computing devices such as workstations, servers, mobile devices, embedded systems, or specialized AI hardware like Graphics Processing Units (GPUs), Tensor Processing Units (TPUs), Field Programmable Gate Arrays (FPGAs), Application-Specific Integrated Circuits (ASICs), or other machine learning accelerators.

Furthermore, the systems can be implemented using various programming languages (such as Python, Java, C++, etc.) and AI libraries (like TensorFlow, PyTorch, etc.). They can be executed as standalone applications, web-based applications, mobile applications, or as components of larger software systems. The systems can also be containerized for deployment in diverse environments using technologies such as Docker or Kubernetes.

Another approach is implementing these systems in cloud environments, using cloud-based AI and machine learning services provided by vendors like Google Cloud, AWS, Microsoft Azure, and others. This could allow for scalable and distributed processing. The systems may also be implemented using a combination of local hardware and cloud-based computations.

Additionally, some or all parts of the systems may be implemented in a distributed fashion across multiple devices or nodes, which could include edge computing scenarios or blockchain-based architectures.

The above examples of implementations are by no means exhaustive. The systems can be realised in any suitable form including hardware, software, firmware, or any combination of these, and can adapt over time as technology advances. The inventions described herein can also be included as an apparatus, system, method, or any new and useful improvement thereof, presented in a patentable class of technology or technologic arts.

All of the features disclosed in this specification (including any accompanying claims, abstract and drawings), and/or all of the steps of any method or process so disclosed, may be combined in any combination, except combinations where at least some of such features and/or steps are mutually exclusive. Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features. The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

It will be appreciated that various embodiments of the present disclosure have been described herein for purposes of illustration, and that various modifications may be made without departing from the scope of the present disclosure. Accordingly, the various embodiments disclosed herein are not intended to be limiting, with the true scope being indicated by the following claims.

The invention claimed is:

1. A computer implemented method for generating a response to a received electronic message, said method comprising:

receiving an electronic message;

prompting a generative AI to analyse the electronic message and to generate:
  intent data indicative of an intent associated with the electronic message, and
  data-identifier data indicative of one or more predetermined data identifiers present in the electronic message;
analysing the electronic message to identify and retrieve client data associated with one or more parties associated with the electronic message;
verifying that the retrieved client data comprises data corresponding to the generated data-identifier data, and if so:
querying an ERP system with the verified data-identifier data to extract ERP data corresponding to the predetermined data identifiers of which the data-identifier data is indicative;
selecting a response-message template using the intent data;
populating the selected response-message template with the ERP data, and
presenting the populated response-message template to a user on a user interface for approval.

2. A computer implemented method according to claim 1, wherein the electronic message is an e-mail.

3. A computer implemented method according to claim 1, wherein the generative AI comprises a Large Language Model (LLM) AI.

4. A computer implemented method according to claim 1, wherein the step of prompting the generative AI to generate intent data comprises prompting the generative AI to generate the intent data in accordance with a constraint instruction instructing the generative AI to constrain the format of the intent data.

5. A computer implemented method according to claim 4, wherein the constraint instruction comprises an instruction to constrain the format of the intent data to fewer than a predetermined number of words.

6. A computer implemented method according to claim 1, wherein prompting the generative AI comprises
  extracting unstructured text data from the electronic message
  generating an input prompt comprising at least some of the unstructured text data from the electronic message and an instruction to analyse the unstructured text data to generate the intent data and the data-identifier data, and
  inputting the input prompt to the generative AI.

7. A computer implemented method according to claim 1, wherein the predetermined data identifiers identify one or more transactions between a party associated with a sender of the electronic message and a party associated with the recipient of the electronic message.

8. A computer implemented method according to claim 1, wherein the response-message template is associated with an accounts-receivable (AR) or accounts-payable (AP) process.

9. A computer program providing instructions which when implemented on a computer system implements a method according to claim 1.

10. A computer system for generating a response to a received electronic message, said system comprising:
  a message receiving application configured to receive an electronic message and forward the received electronic message to a message processing system, said message processing system configured to:
  prompt a generative AI to analyse the electronic message and to generate:
    intent data indicative of an intent associated with the electronic message, and
    data-identifier data indicative of one or more predetermined data identifiers present in the electronic message;
  analyse the electronic message to identify and retrieve client data associated with one or more parties associated with the electronic message;
  verify that the retrieved client data comprises data corresponding to the generated data-identifier data, and if so:
  query an ERP system with the verified data-identifier data to extract ERP data corresponding to the predetermined data identifiers of which the data-identifier data is indicative;
  select a response-message template using the intent data;
  populate the selected response-message template with the ERP data, and
  forward the populated response-message template to the message receiving application for displaying to a user on a user interface for approval.

11. A computer system according to claim 10, wherein the electronic message is an e-mail.

12. A computer system according to claim 10, wherein the generative AI comprises a Large Language Model (LLM) AI.

13. A computer system according to claim 10, wherein the message processing system is configured to prompt the generative AI to generate the intent data in accordance with a constraint instruction instructing the generative AI to constrain the format of the intent data.

14. A computer system according to claim 13, wherein the constraint instruction comprises an instruction to constrain the format of the intent data to fewer than a predetermined number of words.

15. A computer system according to claim 10, wherein the message processing system is configured to prompt the generative AI by:
  extracting unstructured text data from the electronic message
  generating an input prompt comprising at least some of the unstructured text data from the electronic message and an instruction to analyse the unstructured text data to generate the intent data and the data-identifier data, and
  inputting the input prompt to the generative AI.

16. A computer system according to claim 10, wherein the predetermined data identifiers identify one or more transactions between a party associated with a sender of the electronic message and a party associated with the recipient of the electronic message.

17. A computer system according to claim 10, wherein the response-message template is associated with an accounts-receivable (AR) or accounts-payable (AP) process.

* * * * *